US011061554B2

(12) United States Patent
Uemura et al.

(10) Patent No.: US 11,061,554 B2
(45) Date of Patent: Jul. 13, 2021

(54) TOUCH OPERATION FOR DISPLAYING CONTENT IN PLACE OF OTHER CONTENT

(71) Applicant: NOMURA RESEARCH INSTITUTE, LTD., Tokyo (JP)

(72) Inventors: Yuki Uemura, Tokyo (JP); Keisuke Tahara, Tokyo (JP); Shouta Nakai, Tokyo (JP); Tetsuya Nakamura, Tokyo (JP); Kazuma Fukui, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 16/192,467

(22) Filed: Nov. 15, 2018

(65) Prior Publication Data

US 2019/0087064 A1 Mar. 21, 2019

Related U.S. Application Data

(63) Continuation of application No. PCT/JP2017/017879, filed on May 11, 2017.

(30) Foreign Application Priority Data

May 20, 2016 (JP) .............................. JP2016-101271

(51) Int. Cl.
*G06F 3/0488* (2013.01)
*G06F 13/00* (2006.01)
(Continued)

(52) U.S. Cl.
CPC .......... *G06F 3/0488* (2013.01); *G06F 3/0483* (2013.01); *G06F 3/0485* (2013.01);
(Continued)

(58) Field of Classification Search
CPC .... G06F 3/0488; G06F 3/017; G06F 3/04883; G06Q 30/0241; G06Q 30/251
See application file for complete search history.

(56) References Cited

U.S. PATENT DOCUMENTS

| 8,196,066 B1 * | 6/2012 | Ouyang .............. G06F 3/04883 715/708 |
| 9,301,022 B1 | 3/2016 | Rowles |

(Continued)

FOREIGN PATENT DOCUMENTS

| JP | 11-88521 | 3/1999 |
| JP | 2012-155616 | 8/2012 |

(Continued)

OTHER PUBLICATIONS

T. Myer, A Really, Really, Really Good Introduction to XML, published Aug. 24, 2005, downloaded at https://www.sitepoint.com/really-good-introduction-xml/ (Year: 2005).*

(Continued)

*Primary Examiner* — Eric J Yoon

(57) ABSTRACT

A user terminal displays both of main content and an advertisement on a touch panel, the main content and the advertisement being data provided from a server as a response to a provided request of the main content. In a case where a swipe operation by a user is input to the advertisement displayed on the touch panel, the user terminal detects a direction of the swipe operation and notifies the server of the direction of the swipe operation.

10 Claims, 12 Drawing Sheets

(51) Int. Cl.
  *G06Q 30/02* (2012.01)
  *G06F 16/907* (2019.01)
  *G06F 3/0483* (2013.01)
  *G06F 3/0485* (2013.01)

(52) U.S. Cl.
  CPC ............ *G06F 13/00* (2013.01); *G06F 16/907* (2019.01); *G06Q 30/0241* (2013.01); *G06F 2203/04803* (2013.01)

(56) References Cited

U.S. PATENT DOCUMENTS

| | | | | |
|---|---|---|---|---|
| 9,690,441 | B2* | 6/2017 | Kim | G06F 3/048 |
| 2011/0288913 | A1* | 11/2011 | Waylonis | G06Q 30/02 |
| | | | | 705/14.4 |
| 2012/0072270 | A1* | 3/2012 | Waylonis | G06Q 30/02 |
| | | | | 705/14.1 |
| 2013/0173381 | A1* | 7/2013 | Yerli | H04N 21/8173 |
| | | | | 705/14.43 |
| 2015/0177970 | A1* | 6/2015 | Choi | G06F 3/0488 |
| | | | | 715/752 |
| 2016/0294779 | A1* | 10/2016 | Yeakley | H04L 63/126 |

FOREIGN PATENT DOCUMENTS

| | | |
|---|---|---|
| JP | 2013-134770 | 7/2013 |
| JP | 2014-236391 A | 12/2014 |
| JP | 2015-162181 | 9/2015 |
| JP | 2016-24586 | 2/2016 |
| JP | 2016-31667 | 3/2016 |

OTHER PUBLICATIONS

C. Partsenidis, "How does the sender of a data packet know the IP address of the receiver?", website, published Oct. 2003, downloaded from https://searchnetworking.techtarget.com/answer/How-does-the-sender-of-a-data-packet-know-the-IP-address-of-the-receiver-Part-1 (Year: 2003).*

International Search Report dated Jul. 4, 2017 in corresponding International Application No. PCT/JP2017/017879.

English Translation by WIPO of the International Preliminary Report on Patentability dated Nov. 20, 2018 in International Patent Application No. PCT/JP2017/017879.

Japanese Office Action dated Dec. 3, 2019 in corresponding Japanese Patent Application No. 2017-099665.

Japanese Office Action dated Dec. 8, 2020 from Japanese Application No. 2020-007696, 3 pages.

* cited by examiner

TOUCH OPERATION FOR DISPLAYING CONTENT IN PLACE OF OTHER CONTENT

CROSS-REFERENCE TO RELATED APPLICATIONS

This is a continuation of PCT International Application No. PCT/JP2017/017879, filed May 11, 2017, which is hereby incorporated by reference. This application claims benefit of Japanese Patent Application No. 2016-101271, filed in Japan on May 20, 2016 which is hereby incorporated by reference.

BACKGROUND

Technical Field

The present invention relates to a data processing technology, and more particularly to an information processing apparatus, a server, and a computer program.

Related Art

Technologies for additionally displaying, in a web page, an advertisement object conforming to content of the web page have been proposed (see, for example, JP 2016-24586 A).

SUMMARY

A user sometimes inputs a predetermined operation to the web page to delete the advertisement object in the web page. The present inventors considered that a mechanism for collecting user's reactions to advertisement objects without increasing the burden on the user has not been sufficiently proposed so far.

The present invention has been made on the basis of the above recognition of the present inventor and a main object is to provide a technology for efficiently collecting user's reactions to content additionally displayed on a screen.

To solve the above problem, an information processing apparatus according to an aspect of the present invention includes a request unit configured to request a server to provide first content, an acquisition unit configured to acquire both data of the first content and data of second content different from the first content, the data being provided from the server as a response to the request by the request unit, a display control unit configured to display, on a touch panel, both an image of the first content and an image of the second content according to the data acquired by the acquisition unit, a detection unit configured to detect, in a case where a touch operation by a user is input to the image of the second content displayed on the touch panel, a direction of the touch operation, and a notification unit configured to notify the server of information regarding the direction of the touch operation detected by the detection unit.

Another aspect of the present invention is a server. The server includes a providing unit configured to provide, in a case where first content is requested by a client device, both of data of the first content and data of second content different from the first content to the client device to display, on a touch panel of the client device, both an image of the first content and an image of the second content, an acquisition unit configured to acquire, from the client device, information regarding a direction of a touch operation by a user to the image of the second content displayed on the touch panel, and a recording unit configured to record any of a plurality of types of reactions of the user to the second content according to the information regarding a direction of a touch operation acquired by the acquisition unit.

Still another aspect of the present invention is a computer program to be provided to a client device by a server that has been requested to provide first content by the client device. This computer program causes the client device to realize a function to display both an image of first content and an image of second content different from the first content on a touch panel of the client device, a function to detect, in a case where a touch operation of a user is input to the image of the second content displayed on the touch panel, a direction of the touch operation, and a function to notify the server of information regarding the direction of the touch operation detected by the detection function.

Note that any combination of the above constituent elements or the expression of the present invention transformed among a device, a method, a system, a program, and a recording medium storing a computer program is also effective as an aspect of the present invention.

According to the present invention, user's reactions to content additionally displayed on a screen can be efficiently collected.

DETAILED DESCRIPTION

An outline will be described before a configuration of an embodiment is described in detail. In an information system of the embodiment, switching of a display mode of an advertisement additionally displayed on a screen of a user terminal, such as deletion of the advertisement, is instructed by a swipe operation to the advertisement. The swipe operation is an operation of (1) bringing a finger or a stylus pen into contact with the screen, (2) sliding the finger or the stylus pen in an arbitrary direction while maintaining the contact state, and (3) moving the finger or the stylus pen away from the screen. The direction of sliding in (2) is also called "direction of a swipe operation". A plurality of directions (for example, upward, downward, leftward, and rightward) of the swipe operation is associated in advance with a plurality of types of reactions (in other words, feedbacks and impressions) by a user to the advertisement. The user inputs the swipe operation in the direction corresponding to the feedback or impression held to the advertisement displayed on the screen.

The user terminal notifies the server of the direction of the swipe operation input for the advertisement, and the server accumulates the reaction of the user associated with the notified direction. Since the switching of the display mode of an advertisement is realized by the one-time swipe operation in this manner, an increase in a burden on the user can be avoided. Further, various reactions of the user to the advertisement can be fed back to the server (in other words, to the advertiser) without increasing the burden on the user depending on which direction the swipe operation is input, and various actions in response to the reactions of the user can be executed by the server Note that the user operation of switching the display mode of an advertisement is not limited to the swipe operation and another type of touch operation (for example, a flick operation) that can specify the direction may be adopted.

Figure 1:
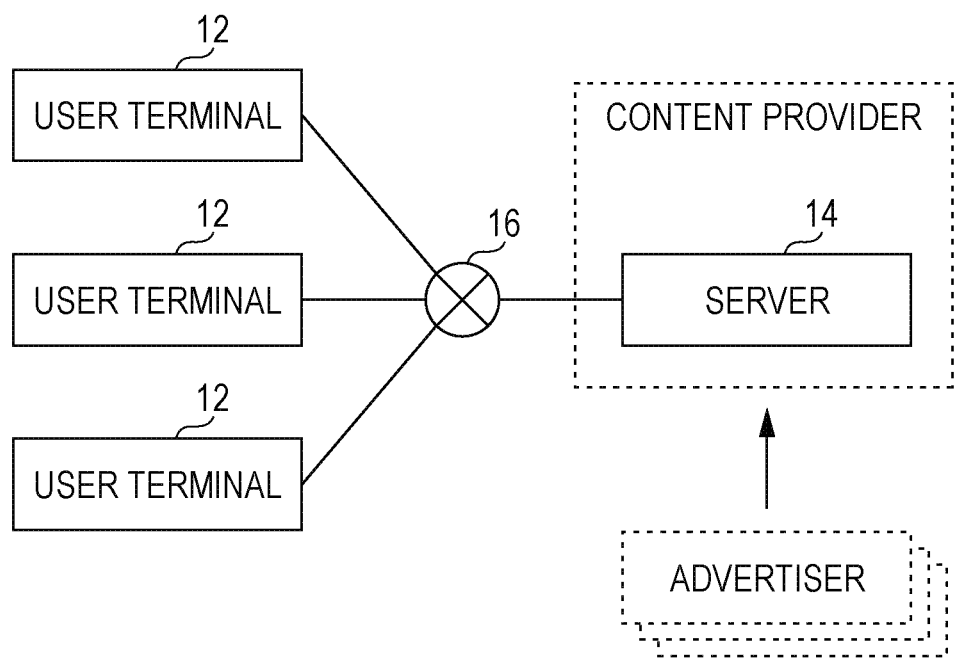
FIG. 1 is a diagram illustrating a configuration of an information system according to an embodiment.

FIG. 1 illustrates a configuration of an information system 10 according to an embodiment. The information system 10 includes a plurality of user terminals 12 and a server 14. Each user terminal 12 is connected to the server 14 via a communication network 16 including a LAN, a WAN, the Internet, and the like. Each user terminal 12 is an information processing apparatus including a touch panel and operates as a client to the server 14. Each user terminal 12 may be, for example, a smartphone or a tablet terminal.

The server 14 is an information processing apparatus owned by a content provider, and provides a web page program including various types of content such as a social networking service (SNS), a portal site, and a news site to the user terminal 12. The server 14 may be realized by an arbitrary combination of a web server, an application server, and a database server. The server 14 provides a web page program including advertisement data specified by each of a plurality of advertisers to the user terminal 12.

Figure 2:
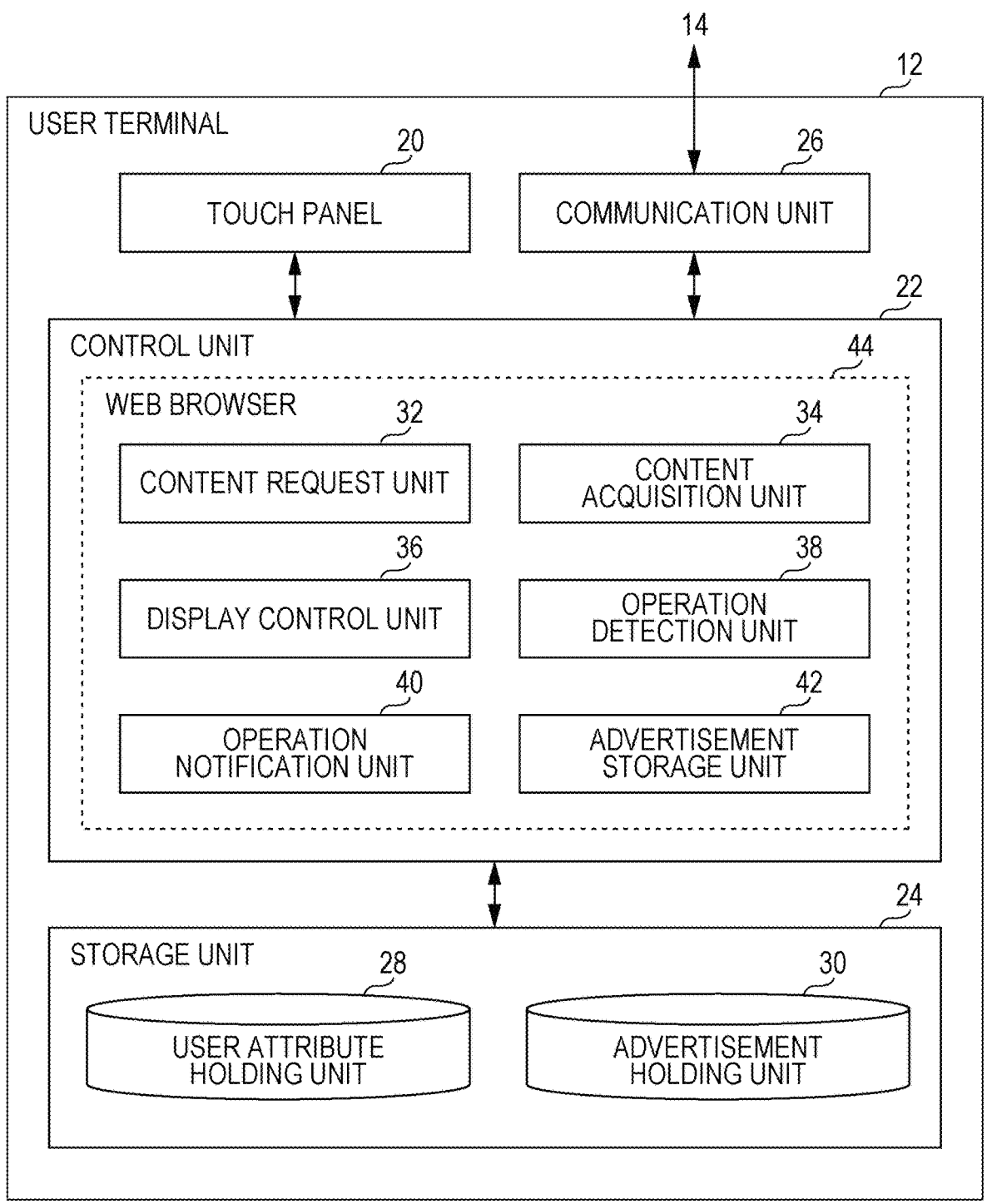
FIG. 2 is a block diagram illustrating a functional configuration of a user terminal in FIG. 1.

FIG. 2 is a block diagram illustrating a functional configuration of the user terminal 12 in FIG. 1. The user terminal 12 includes a touch panel 20, a control unit 22, a storage unit 24, and a communication unit 26. Each block illustrated in the block diagram of the present specification can be realized by elements and mechanical devices such as a CPU and a memory of a computer in terms of hardware and can be realized by a computer program or the like in terms of software. Here, functional blocks realized by cooperation of the hardware and software are drawn. Therefore, it should be understood by those skilled in the art that these functional blocks can be realized in various forms by a combination of the hardware and software.

For example, the functional blocks of the control unit 22 may be realized by a CPU of the user terminal 12 that executes a web browser application (a web browser 44 to be described below) and executes the web page program and the like provided from the server 14. Further, the functional blocks of the storage unit 24 may be realized by a memory or a storage of the user terminal 12 that stores data.

The touch panel 20 has functions of an operation input unit to which a user's operation is input and a display unit to display various images according to instructions from the control unit 22. The control unit 22 executes various types of data processing including processing as the web browser 44. The storage unit 24 is a storage area for data to be referred to and updated by the control unit 22. The communication unit 26 communicates with an external device according to a predetermined communication protocol. The control unit 22 transmits data to or receives data from the server 14 via the communication unit 26.

The storage unit 24 includes a user attribute holding unit 28 and an advertisement holding unit 30. The user attribute holding unit 28 holds information (hereinafter referred to as "user attribute information") indicating an attribute permitted by the user to provide to the server 14 among a plurality of types of attributes related to the user. The user attribute information may include personal information of the user. The user attribute information of the embodiment includes a sex, an age, and an SNS account of the user. The advertisement holding unit 30 holds advertisement data stored by an advertisement storage unit 42 to be described below.

The control unit 22 includes a content request unit 32, a content acquisition unit 34, a display control unit 36, an operation detection unit 38, an operation notification unit 40, and the advertisement storage unit 42. These functional blocks may be realized as functions of the web browser 44. Further, these functional blocks may be realized by the web browser 44 that processes web page data provided from the server 14. The web page data provided from the server 14 may be a combination of image data, an HTML program, and a Javascript (registered trademark) program. Further, the function of at least one block of the control unit 22 may be implemented in the Javascript program included in the web page data.

The content request unit 32 transmits, to the server 14, data requesting provision of content (hereinafter also referred to as "main content") that is content specified by the web browser 44 and is a main display object on the touch panel 20. The data transmitted by the content request unit 32 to the server 14 is, for example, an HTTP request specifying a URL of a specific web page as the main content. The main content to be requested may be specified by the user, may be determined by setting in the web browser 44, or may be dynamically determined by processing of a program or the like.

The content acquisition unit 34 acquires the web page data (in other words, an HTTP response) provided from the server 14 as a response to the request by the content request unit 32. The web page data acquired by the content acquisition unit 34 from the server 14 includes both an ID and data of the main content and an ID and data of additional content different from the main content. The additional content in the embodiment is an advertisement.

The web page data acquired by the content acquisition unit 34 from the server 14 further includes reaction definition information (in other words, reaction definition information predetermined by the advertiser) to be described below corresponding to the advertisement. As will be described below, the reaction definition information is, for example, information indicating that a swipe operation in an up direction means "want to see another advertisement" and a swipe operation in a left direction means "obstacle". Further, in a case where directions of the swipe operation correspond to an advertisement deletion direction, an advertisement storage direction, and an advertisement switch direction, which will be described below, the reaction definition information also includes the information.

The display control unit 36 controls a display mode of a browser screen that is a screen of the web browser 44, and displays the browser screen on the touch panel 20 in the user terminal 12. The display control unit 36 displays the data acquired by the content acquisition unit 34 on the browser screen. In a case where both data of the main content data and data of the advertisement are acquired, the display control unit 36 displays both an image of the main content and an image of the advertisement on the browser screen. Note that the "image" includes still images and moving images illustrating various graphics and texts.

In a case where the swipe operation is input to the image of the advertisement displayed on the touch panel 20, the operation detection unit 38 detects the direction of the swipe operation. Specifically, the operation detection unit 38 holds while updating a current display position of the advertisement image on the browser screen on the basis of a predetermined initial display position and a user operation on the browser screen. The operation detection unit 38 may determine that the user operation is a swipe operation to the advertisement image in a case where the operation detection unit 38 detects a swipe operation on the browser screen, and a touch position in the swipe operation matches the current display position of the advertisement image. Then, the operation detection unit 38 may detect the direction of the swipe operation.

The operation notification unit 40 notifies the server 14 of information regarding the direction of the swipe operation (hereinafter also referred to as "user operation information") detected by the operation detection unit 38. The operation notification unit 40 may execute Asynchronous JavaScript+ XML (Ajax) communication with the server 14, and transmit the user operation information to the server 14 asynchronously with the update of the entire browser screen.

The user operation information is information indicating at least the direction of the swipe operation detected by the operation detection unit 38, and includes information typically indicating that the swipe operation in any of the up, down, right, and left directions has been input. The user operation information of the embodiment includes an ID of the advertisement for which the swipe operation has been made, the ID of the main content displayed together with the advertisement, and the user attribute information held in the user attribute holding unit 28 in addition to the information indicating the direction of the swipe operation.

In a case where the swipe operation to a predetermined direction (hereinafter also referred to as "advertisement deletion direction") to the advertisement image is detected by the operation detection unit 38, the display control unit 36 terminates display of the advertisement image for which the swipe operation has been made. In other words, the display control unit 36 updates the content of the browser screen to a mode excluding the advertisement image for which the swipe operation has been made (for example, a mode in which only the main content remains).

In a case where the swipe operation to a predetermined direction (hereinafter also referred to as "advertisement storage direction") to the advertisement image is detected by the operation detection unit 38, the advertisement storage unit 42 stores the data of the advertisement displayed on the browser screen at that time to the advertisement holding unit 30. In a case where a predetermined operation is input, the display control unit 36 displays the advertisement image stored in advance in the advertisement holding unit 30 without accompanying the image of the main content displayed together with the advertisement image at the time of storing the advertisement image. The display control unit 36 of the embodiment displays a list of one or more advertisement images stored in advance in the advertisement holding unit 30 on a browser screen dedicated to advertisement browsing.

In a case where the swipe operation to a predetermined direction (hereinafter also referred to as "advertisement switch direction") to the advertisement image is detected by the operation detection unit 38, the content acquisition unit 34 acquires data of an advertisement (hereinafter also referred to as "replacement advertisement") different from the advertisement displayed until then from the server 14. The content acquisition unit 34 may execute Ajax communication with the server 14 and acquire the data of the replacement advertisement asynchronously with update of the entire browser screen. In a case where the swipe operation in the advertisement switch direction to the advertisement image is detected by the operation detection unit 38 and the replacement advertisement is acquired by the content acquisition unit 34, the display control unit 36 switches the advertisement displayed until then to the replacement advertisement.

Note that the operation detection unit 38 detects a touch operation to the advertisement image at a stage prior to the swipe operation detection when the swipe operation to the advertisement image is input. In the case where the touch operation to the advertisement image is detected, the display control unit 36 displays a pop-up indicating meaning of the directions of the swipe operations on the browser screen according to the reaction definition information included in the web page data provided from the server 14.

Figure 3:
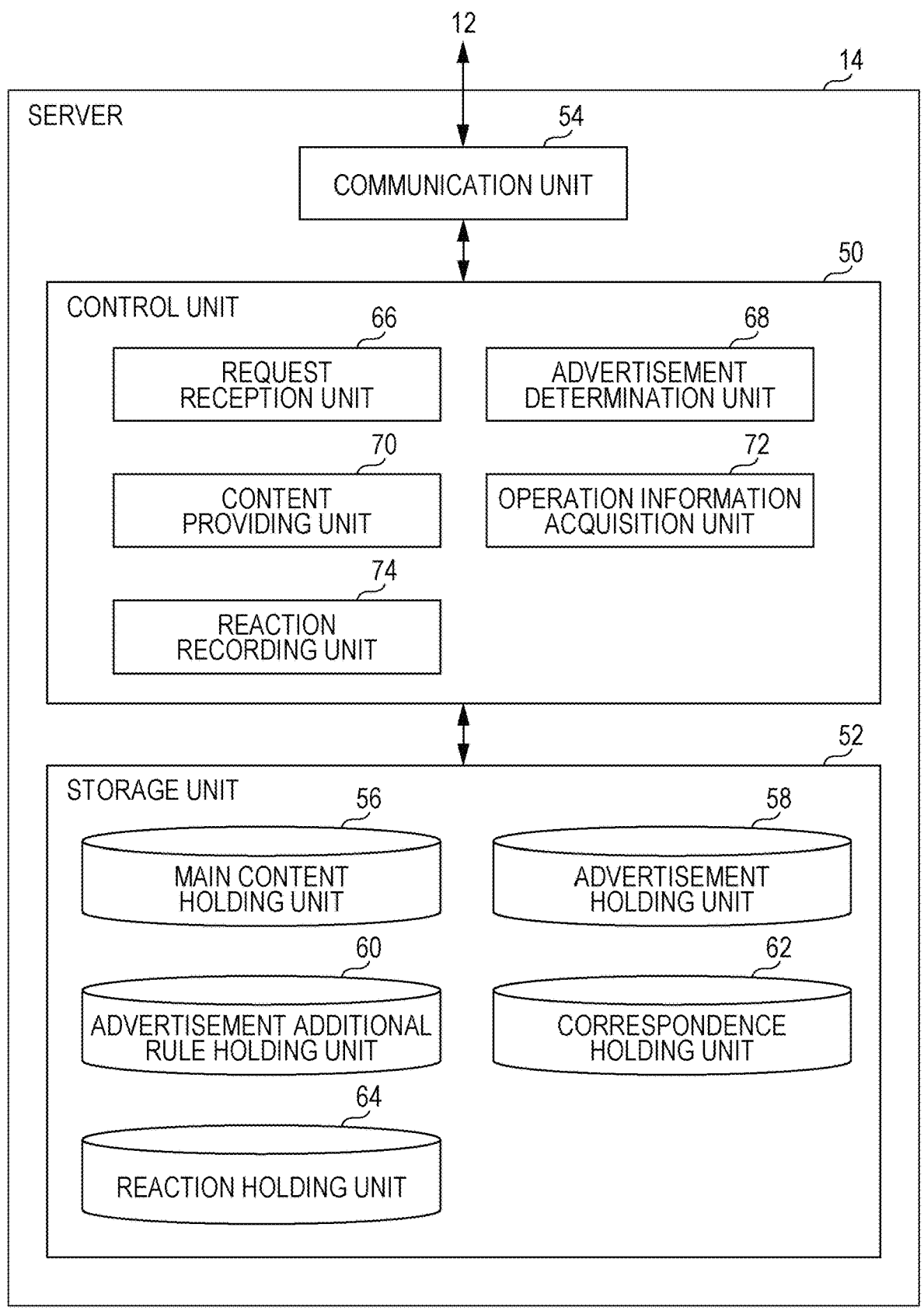
FIG. 3 is a block diagram illustrating a functional configuration of a server in FIG. 1.

FIG. 3 is a block diagram illustrating a functional configuration of the server 14 in FIG. 1. The server 14 includes a control unit 50, a storage unit 52, and a communication unit 54. The control unit 50 executes various types of data processing as a web server, an application server, and a database server. The storage unit 52 is a storage area for data to be referred to and updated by the control unit 50. The communication unit 54 communicates with an external device according to a predetermined communication protocol. The control unit 50 transmits data to or receives data from the user terminal 12 via the communication unit 54.

The storage unit 52 includes a main content holding unit 56, an advertisement holding unit 58, an advertisement additional rule holding unit 60, a correspondence holding unit 62, and a reaction holding unit 64. The main content holding unit 56 holds the data of the main content (for example, an SNS) that is main content provided by a content provider. Specifically, the main content holding unit 56 holds the data of a plurality of pieces of the main content, provision of which can be requested by the user terminal 12, in association with the IDs of the pieces of main content.

The advertisement holding unit 58 holds the advertisement data (image data or the like) specified by the plurality of respective advertisers to be provided to the user, that is, holds a plurality of the advertisement data corresponding to the plurality of advertisers. Specifically, the advertisement holding unit 58 holds the advertisement data, an ID of the advertisement, an ID of the advertiser, a category, and a characteristic word in association with each advertisement. The category is, for example, data indicating a product, a service, a business category, or a field indicated by the advertisement. The characteristic word includes, for example, a character string indicating the category, a character string included in the advertisement, and a keyword of the advertisement.

When providing each of the plurality of pieces of main content to the user terminal 12, the advertisement additional rule holding unit 60 holds an advertisement additional rule that is a rule (in other words, a logic) for determining the advertisement to be added to each main content. The advertisement additional rule may indicate a correspondence relationship in which each main content and a plurality of advertisements are associated with one to N (N is an integer of 1 or more). Further, the advertisement additional rule may specify addition of an advertisement having the same or similar characteristic word to the characteristic word extracted from the main content.

Regarding the correspondence relationship between the plurality of directions of the swipe operation to the advertisement image and the plurality of types of reactions of the user to the advertisement image, the correspondence holding unit 62 holds a plurality of correspondence relationships (hereinafter referred to as "reaction definition information") specified in advance by the plurality of advertisers. In other words, the correspondence holding unit 62 holds the reaction definition information predefined by each of the plurality of advertisers in association with the ID of each advertiser and the ID of each advertisement. Note that the reaction definition information may be determined for each advertiser or may be determined for each advertisement.

Figure 4A:
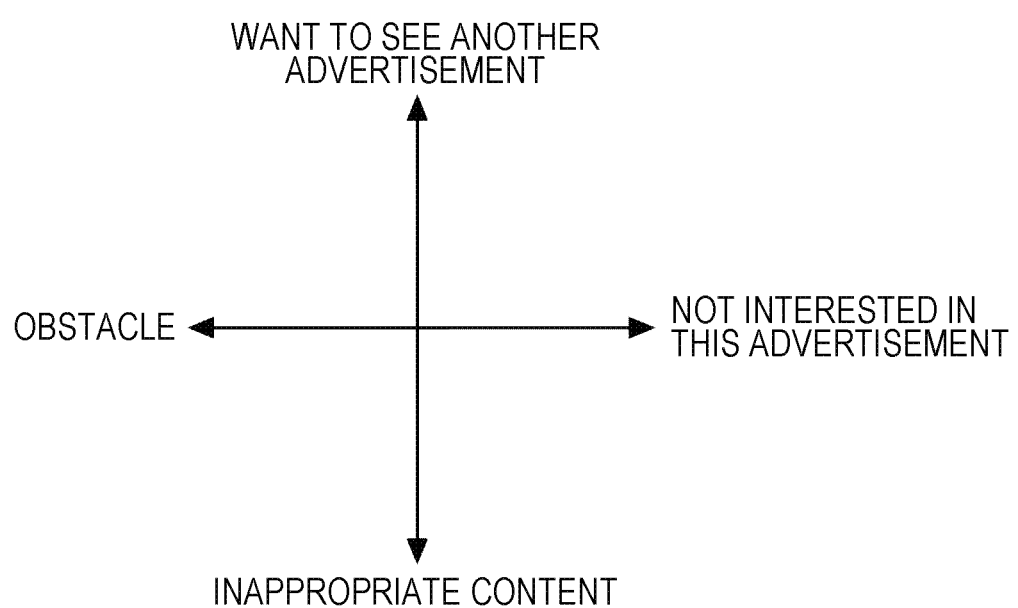
FIGS. 4A and 4B are diagrams illustrating examples of reaction definition information.
Figure 4B:
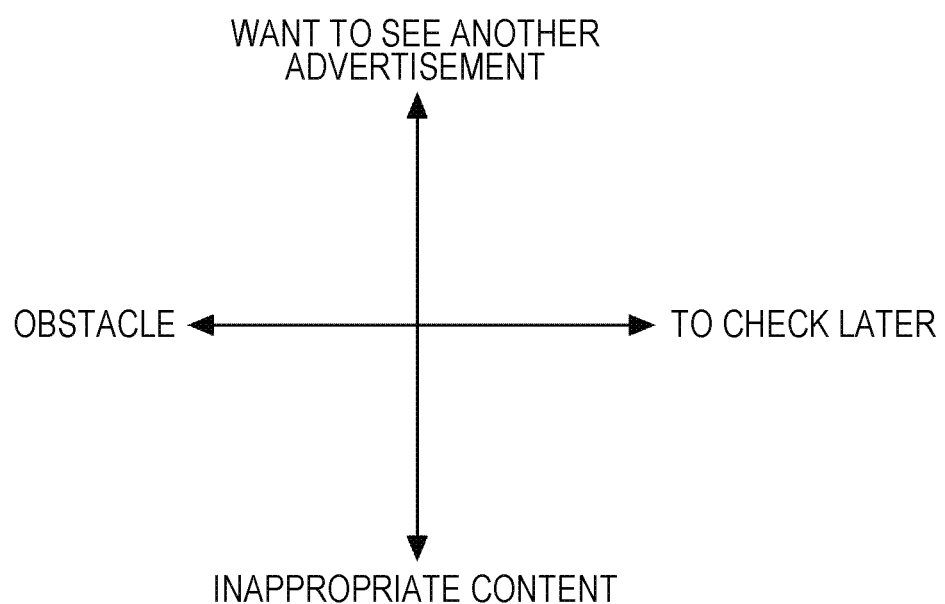

FIGS. 4A and 4B illustrate examples of the reaction definition information. The reaction definition information in FIG. 4A will be described. The left direction is associated with the reaction type "obstacle", that is, means that the existence of the advertisement is an obstacle and the display of the advertisement should be terminated. The down direction is associated with a reaction type "inappropriate content", that is, means that the content of the advertisement gives inappropriate/unpleasant impression and the display of the advertisement should be terminated. The right direction is associated with a reaction type "not interested in this advertisement", that is, means that the advertisement should be switched to another advertisement in another category. The up direction is associated with a reaction type "want to see another advertisement", that is, means that the advertisement should be switched to another advertisement in the same category. The left direction and the down direction in FIG. 4A are the advertisement deletion direction, and the right direction and the up direction in FIG. 4A are the advertisement switch direction.

The reaction definition information in FIG. 4B will be described. The left direction, the down direction, and the up direction in FIG. 4B are the same as those in FIG. 4A. The right direction in FIG. 4B is associated with a reaction type "to check later", that is, means that the user is interested in the advertisement to some extent but the advertisement should be displayed in a later point of time. The right direction in FIG. 4B is the advertisement deletion direction and the advertisement storage direction.

Figure 5:
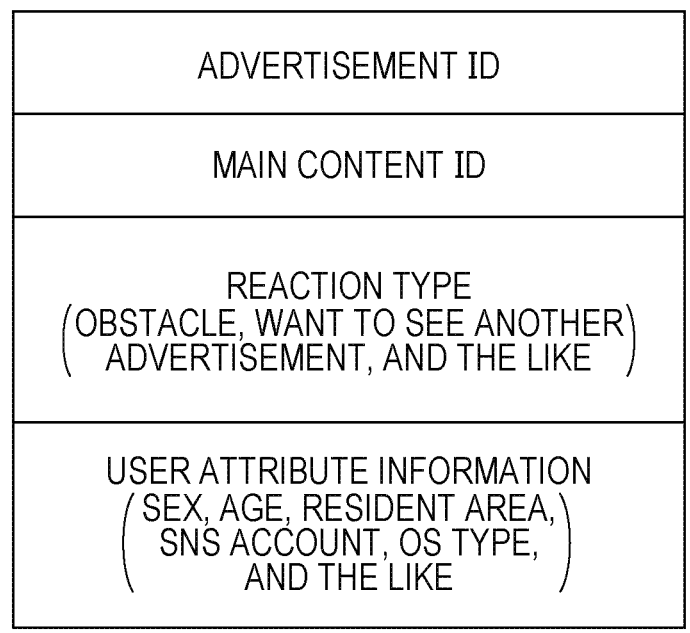
FIG. 5 is a diagram illustrating a configuration of user reaction information.

Referring back to FIG. 3, the reaction holding unit 64 holds information indicating the reactions of the user to the plurality of respective advertisements (hereinafter referred to as "user reaction information"). FIG. 5 illustrates a configuration of the user reaction information. The user reaction information includes the ID of the advertisement swiped by the user, the ID of the main content, the reaction type, and the user attribute information.

Returning to FIG. 3, the control unit 50 includes a request reception unit 66, an advertisement determination unit 68, a content providing unit 70, an operation information acquisition unit 72, and a reaction recording unit 74. The request reception unit 66 receives data requesting provision of the main content from the user terminal 12.

The advertisement determination unit 68 determines an advertisement to be added to the main content from among the plurality of advertisements held in the advertisement holding unit 58 according to the main content requested by the user terminal 12 and the advertisement additional rule held in the advertisement additional rule holding unit 60. For example, the advertisement determination unit 68 may extract the characteristic word from the main content to be provided to the user terminal 12 or its metadata, and select an advertisement associated with the characteristic word as the advertisement to be provided to the user terminal 12.

The content providing unit 70 provides both the data of the main content held in the main content holding unit 56 and the advertisement data held in the advertisement holding unit 58 to the user terminal 12 as a response to the main content provision request received by the request reception unit 66. Specifically, the content providing unit 70 transmits the web page data including both the data of the main content requested by the user terminal 12 and the advertisement data selected by the advertisement determination unit 68 to the user terminal 12.

As partially described above, the web page data provided by the content providing unit 70 to the user terminal 12 includes the HTML program defining the display mode of the web page and the Javascript program for controlling the operation of the web browser. The functional blocks of the web browser 44 illustrated in FIG. 2 are realized when the web browser 44 of the user terminal 12 executes the web page data provided by the content providing unit 70 to the user terminal 12.

That is, the web page data provided by the content providing unit 70 to the user terminal 12 causes the user terminal 12 to realize the following processing. (1) A function to display both the main content image and the advertisement image on the touch panel 20 of the user terminal 12. (2) A function to detect the direction of the swipe operation in a case where the swipe operation by the user is input to the advertisement image displayed on the touch panel 20. (3) A function to notify the server 14 of the information regarding the detected direction of the swipe operation.

The operation information acquisition unit 72 acquires the information regarding the direction of the swipe operation input by the user to the advertisement displayed on the browser screen from the user terminal 12. The operation information acquisition unit 72 according to the embodiment receives the user operation information transmitted from the user terminal 12.

The reaction recording unit 74 records any of the plurality of types of reactions of the user to the advertisement according to the information regarding the direction of the swipe operation acquired by the operation information acquisition unit 72. Further, in a case where the information regarding the direction of the swipe operation input by the user to a certain advertisement, the reaction recording unit 74 records the type of the reaction of the user to the advertisement according to the correspondence relationship specified in advance by the advertiser of the advertisement.

The reaction recording unit 74 of the embodiment identifies the direction of the swipe operation indicated by the user operation information received by the operation information acquisition unit 72, and identifies the meaning of the direction of the swipe operation as the reaction type by reference to the reaction definition information associated with the advertisement ID indicated by the user operation information. Then, the reaction recording unit 74 stores the user reaction information in which the identified reaction type is associated with the advertisement ID, the main content ID, and the user attribute indicated by the user operation information to the reaction holding unit 64.

For example, in a case where the reaction definition information in FIG. 4A is associated with the advertisement ID indicated by the user operation information, and the direction of the swipe operation indicated by the user operation information is the left direction, the reaction recording unit 74 records the reaction type "obstacle". Meanwhile, in a case where the direction of the swipe operation indicated by the user operation information is the down direction, the reaction recording unit 74 records the reaction type "inappropriate content".

In a case where the direction of the swipe operation in a specific user terminal 12 acquired by the operation information acquisition unit 72 is a predetermined direction, the content providing unit 70 provides advertisement data different from the advertisement provided to the user terminal 12 at the previous point of time to the user terminal 12. With the provision, the content providing unit 70 switches the advertisement displayed on the browser screen of the user terminal 12.

Specifically, the content providing unit 70 determines whether the direction of the swipe operation is the advertisement switch direction by reference to the reaction definition information associated with the advertisement ID indicated by the user operation information. For example, in a case where the reaction definition information is associated with the advertisement ID (FIG. 4A) indicated by the user operation information, the up direction and the right direction correspond to the advertisement switch direction. Further, in a case where the reaction definition information is associated with the advertisement ID (FIG. 4B) indicated by the user operation information, the up direction corresponds to the advertisement switch direction.

In a case where the direction of the swipe operation corresponds to the advertisement switch direction, the content providing unit 70 provides an advertisement different from the advertisement specified with the advertisement ID indicated by the user operation information to the user terminal 12. For example, the content providing unit 70 may transmit another advertisement data to the user terminal 12 as a response to the Ajax communication (for example, XMLHttpRequest) notifying the direction of the swipe operation.

More specifically, in a case where the direction of the swipe operation corresponds to a first advertisement switch direction (for example, "want to see another advertisement"), the advertisement determination unit 68 selects another advertisement belonging to the same category as the advertisement specified with the advertisement ID indicated by the user operation information as the replacement advertisement. The content providing unit 70 transmits the data of the replacement advertisement selected by the advertisement determination unit 68 to the user terminal 12. Meanwhile, in a case where the direction of the swipe operation corresponds to a second advertisement switch direction (for example, "not interested in this advertisement"), the advertisement determination unit 68 selects another advertisement belonging to a category different from the advertisement specified with the advertisement ID indicated by the user operation information as the replacement advertisement. The content providing unit 70 transmits the data of the replacement advertisement selected by the advertisement determination unit 68 to the user terminal 12.

An operation of the information system 10 with the above configuration will be described below.

Figure 6:
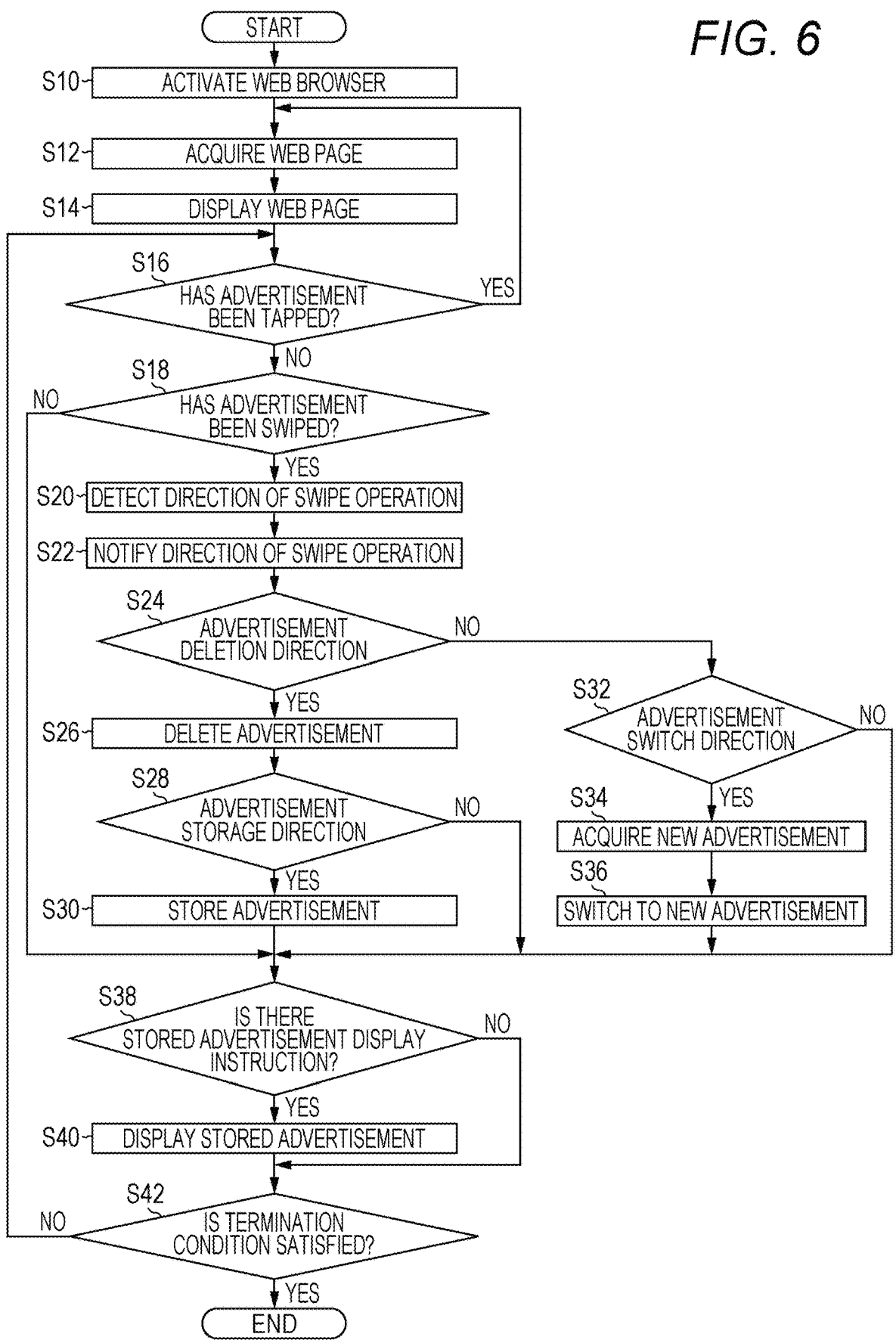
FIG. 6 is a flowchart illustrating an operation of the user terminal.

FIG. 6 is a flowchart illustrating an operation of the user terminal 12. The user activates the web browser 44 in the user terminal 12 (S10) and instructs display of specific main content provided by the content provider. The content request unit 32 transmits an HTTP request specifying a URL of the main content instructed by the user to the server 14. The content acquisition unit 34 receives an HTTP response including the requested main content data and the advertisement data added to the main content from the server 14 (S12).

Figure 7:
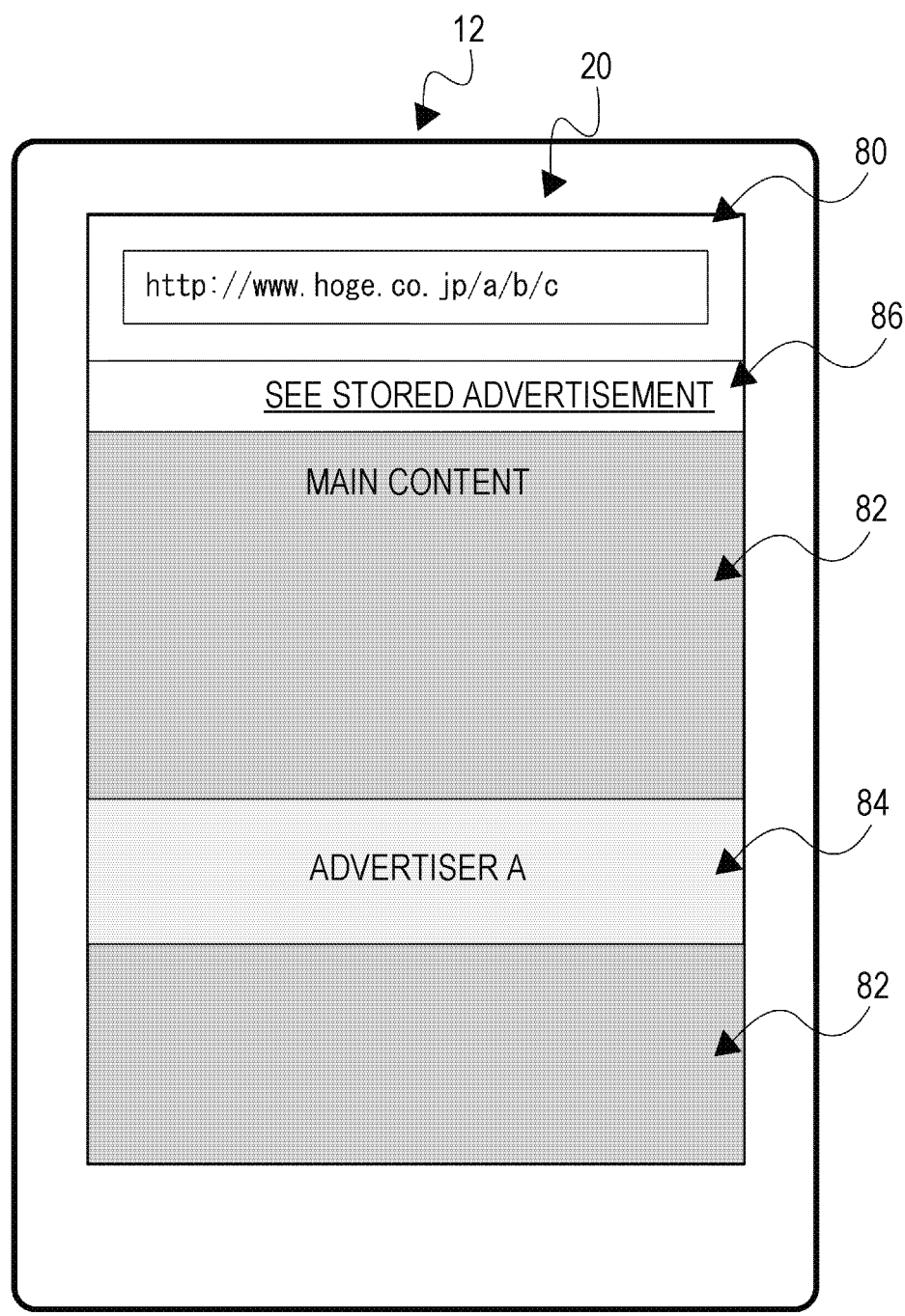
FIG. 7 is a diagram schematically illustrating display of a web page in the user terminal.

The display control unit 36 displays the web page including both the main content and the advertisement on the touch panel 20 (S14). FIG. 7 schematically illustrates display of the web page in the user terminal 12. The display control unit 36 displays, on the touch panel 20, a browser screen 80 including an image obtained as a result of rendering the web page data provided from the server 14. In S14, the display control unit 36 displays the browser screen 80 including the image of the main content (main content 82), an image of an advertisement A (advertisement A84), and a link 86.

Returning to FIG. 6, when the operation detection unit 38 detects an input of the tap operation to the advertisement A84 (YES in S16), the processing returns to S12, and the content request unit 32 transmits the HTTP request specifying the URL set in the advertisement A84 to the server 14. Then, in S14, typically, a web page of a product or a service indicated by the advertisement A84 is displayed on the browser screen 80 in place of the web page illustrated in FIG. 7.

Figure 8:
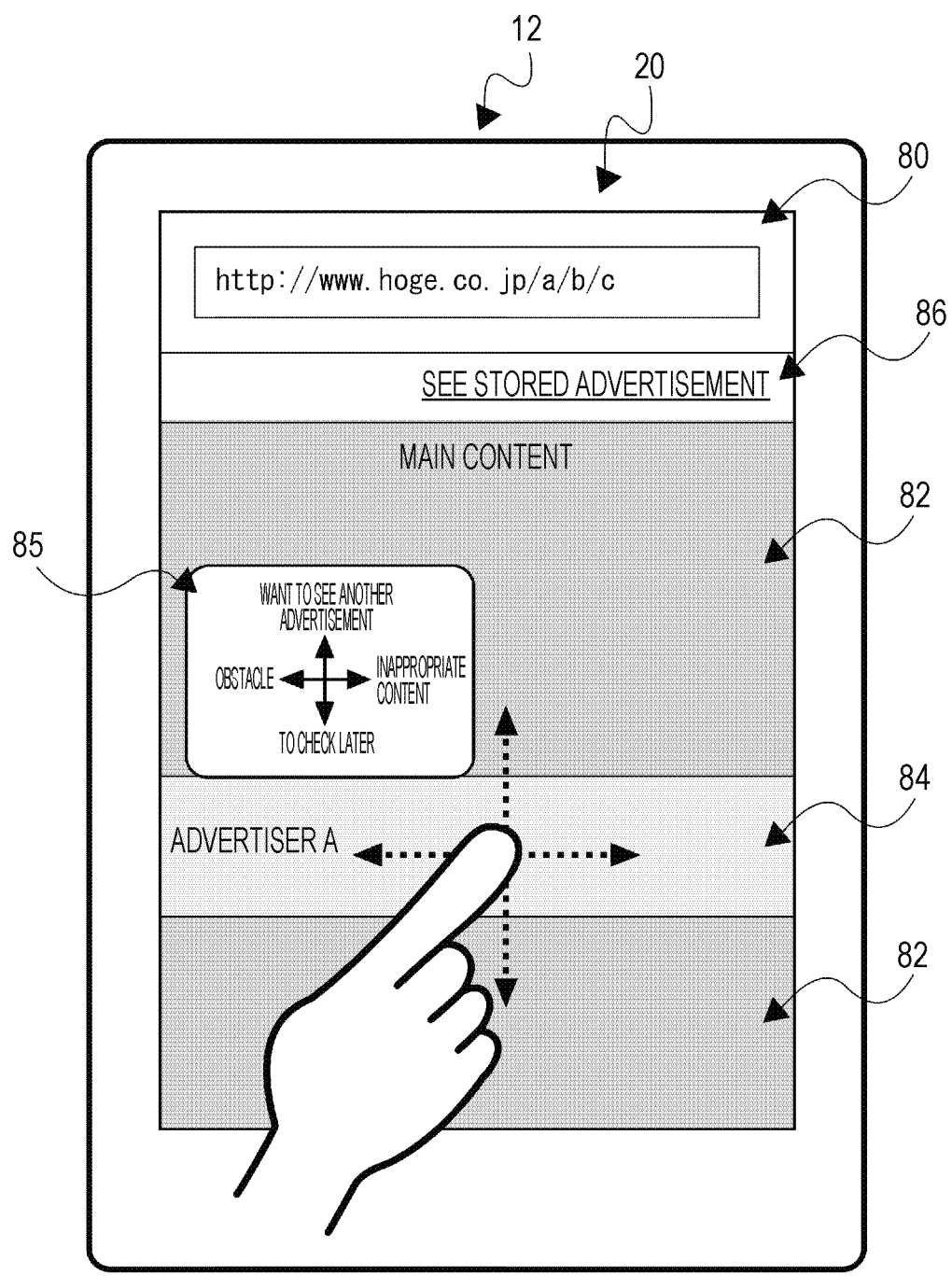
FIG. 8 is a diagram schematically illustrating display of a web page in the user terminal.

Next, the swipe operation to the advertisement A84 in FIG. 7 is input. As illustrated in FIG. 8, when the operation detection unit 38 detects a touch (as a preliminary stage of the swipe operation) to the advertisement A84, the display control unit 36 displays a guide 85 on the browser screen 80, the guide 85 being a pop-up illustrating the reaction definition information (that is, the meaning of the directions of the swipe operation) predefined by the advertiser of the advertisement A84. The display control unit 36 may display the guide 85 in a case where a touch of a predetermined time or more (for example, one second or more) to the advertisement A84 is detected. The user slides the finger in a direction that matches the feedback or impression to the advertisement A84 to input the swipe operation while referring to the content of the guide 85. Note that the meaning indicated by the directions of the swipe operation may differ for each advertisement or advertiser, may be common irrespective of difference in advertisements/advertisers, or may be common to content providers.

Figure 9:
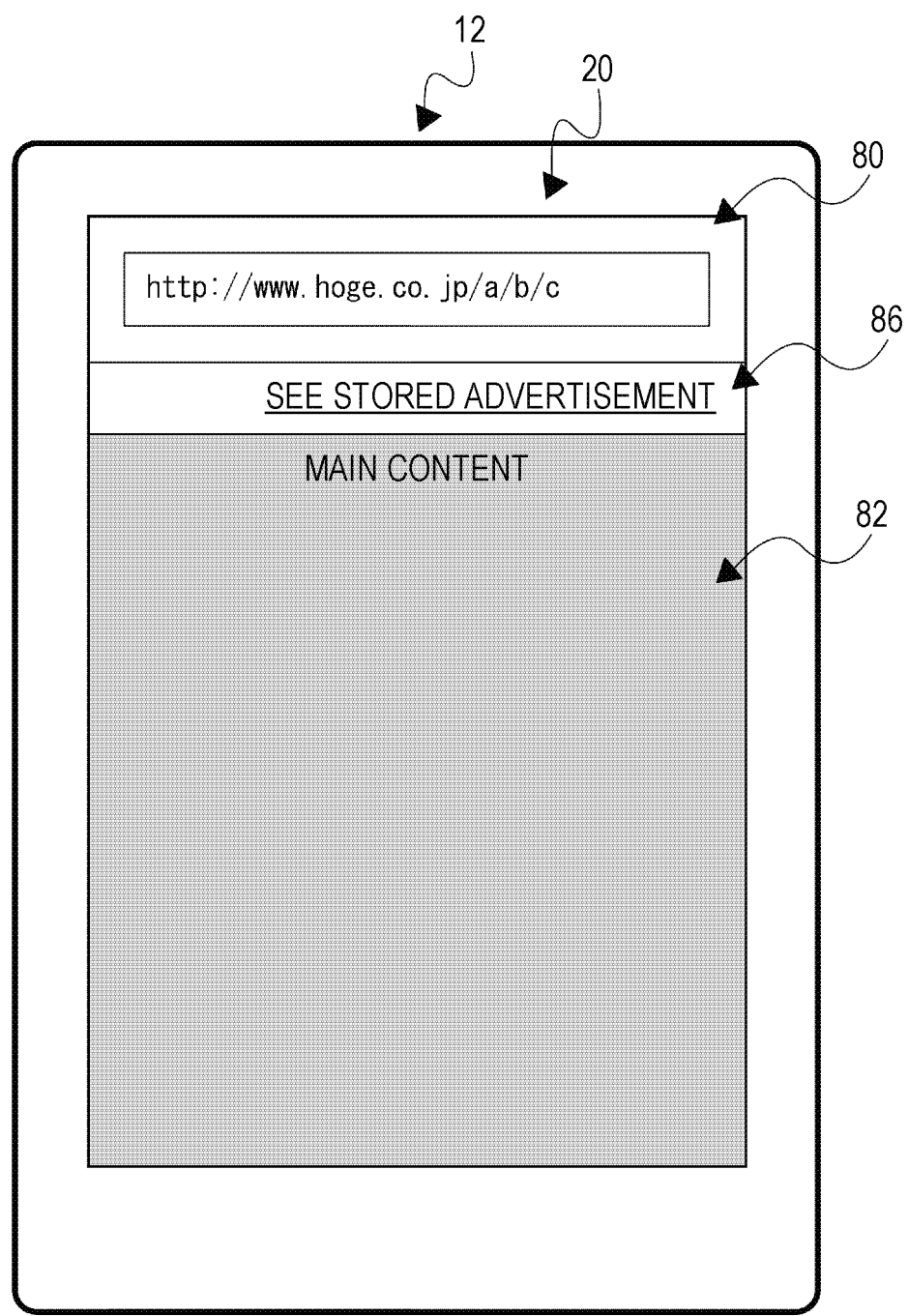
FIG. 9 is a diagram schematically illustrating display of a web page in the user terminal.

Returning to FIG. 6, when the swipe operation is input (YES in S18) instead of the tap operation to the advertisement A84 (NO in S16), the operation detection unit 38 detects the direction of the swipe operation (S20). The operation notification unit 40 notifies the server 14 of the direction of the swipe operation (S22). When the direction of the swipe operation corresponds to the advertisement deletion direction (for example, left or down in FIG. 4A, or left, down, or right in FIG. 4B) (YES in S24), the display control unit 36 deletes the advertisement A84 from the browser screen 80 (S26). FIG. 9 illustrates the browser screen 80 from which the advertisement A84 has been deleted. Further, when the direction of the swipe operation corresponds to the advertisement storage direction (for example, right in FIG. 4B) (YES in S28), the advertisement storage unit 42 stores the data of the advertisement A84 to the advertisement holding unit 30 (S30). When the direction of the swipe operation is not the advertisement storage direction (NO in S28), S30 is skipped.

Figure 10:
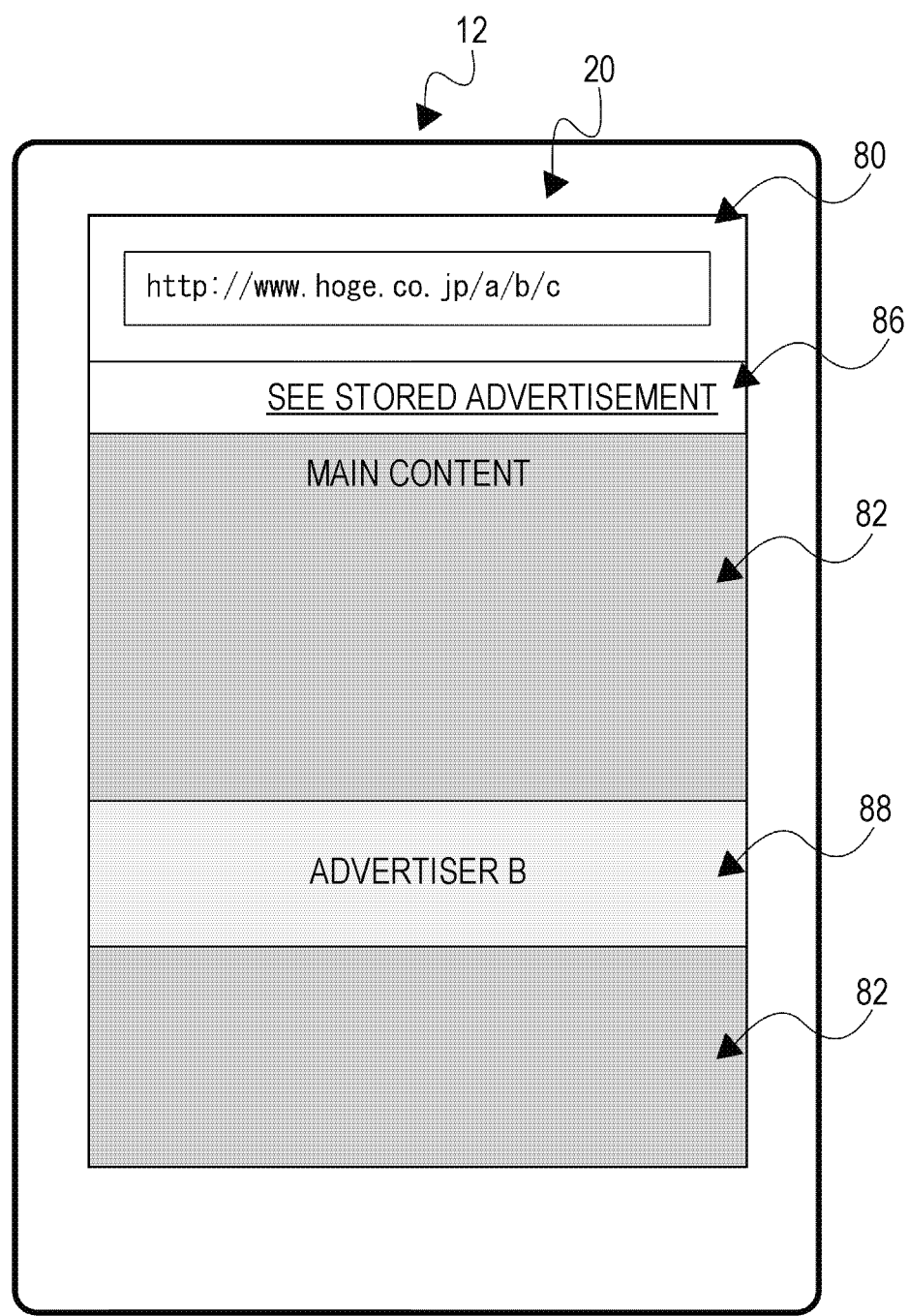
FIG. 10 is a diagram schematically illustrating display of a web page in the user terminal.

When the direction of the swipe operation is not the advertisement deletion direction (NO in S24) and corresponds to the advertisement switch direction (YES in S32), the content acquisition unit 34 acquires data of an advertisement B different from the advertisement A from the server 14 (S34). The display control unit 36 switches the advertisement to be displayed together with the main content 82 on the browser screen 80 from the advertisement A84 to an advertisement B88 (S36). FIG. 10 illustrates a state in which the advertisement displayed on the browser screen 80 is switched from the advertisement A84 to the advertisement B88. When the direction of the swipe operation is not the advertisement deletion direction and not the advertisement switch direction (NO in S32), S34 and S36 are skipped. When the swipe operation to the advertisement A84 has not been input (NO in S18), S20 to S36 are skipped.

In a case where an instruction to display the advertisement stored in S30 is input, in the embodiment, in a case where the tap operation to the link 86 on the browser screen 80 is detected by the operation detection unit 38 (YES in S38), the display control unit 36 reads data of one or more advertisements stored in the advertisement holding unit 30. Then, images of the read one or more advertisements are displayed as a list on the browser screen 80 (S40).

Figure 11:
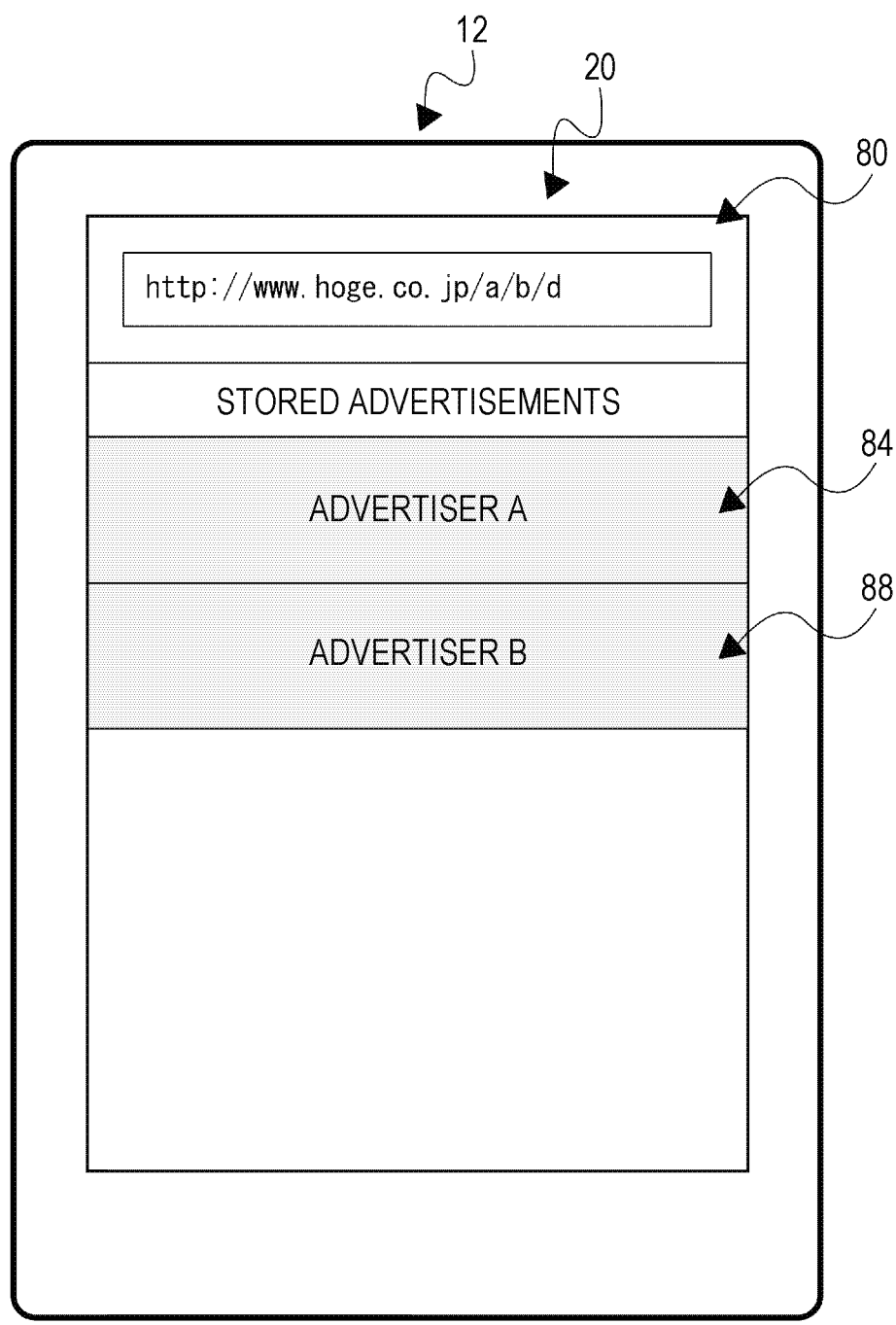
FIG. 11 is a diagram schematically illustrating display of a web page in the user terminal.

FIG. 11 illustrates the browser screen 80 on which the stored advertisements are displayed. The browser screen 80 in FIG. 11 can be said to be a screen displaying a list of advertisement A84 and advertisement B88 stored in advance. For example, the user terminal 12 may request the server 14 to provide a web page of a stored advertisement list screen, and the server 14 may provide, to the user terminal 12, a web page including a Javascript code for reading advertisement data from a predetermined local storage area (advertisement holding unit 30). The display control unit 36 may display the web page on the browser screen 80 and display one or more advertisement images stored in the advertisement holding unit 30 at that time.

When the instruction to display the stored advertisement is not input (NO in S38), S40 is skipped. When a predetermined termination condition is satisfied (YES in S42), the flow in FIG. 6 is terminated. When the termination condition is not satisfied (NO in S42), the processing returns to S16, that is, returns to a state waiting for the operation input by the user. This termination condition is satisfied, for example, when an operation instructing termination of the web browser 44 is input or when an operation to close the browser screen 80 is input.

The user terminal 12 in the embodiment notifies the server 14 of the direction of the swipe operation of the user to the advertisement image added to the main content. The server 14 stores the plurality of types of reactions of the users to the advertisement in advance in association with the plurality of directions of the swipe operation. Therefore, the direction of the swipe operation input to the advertisement image by the user terminal 12 is notified to the server 14, whereby the type of the reaction of the user to the advertisement can be recorded in the server 14. At the same time, deletion/storage/switching of the advertisement image can be realized by one swipe operation. Therefore, the increase in the burden on the user can be suppressed while various feedbacks and impressions of the user to the advertisement can be fed back.

Figure 12:
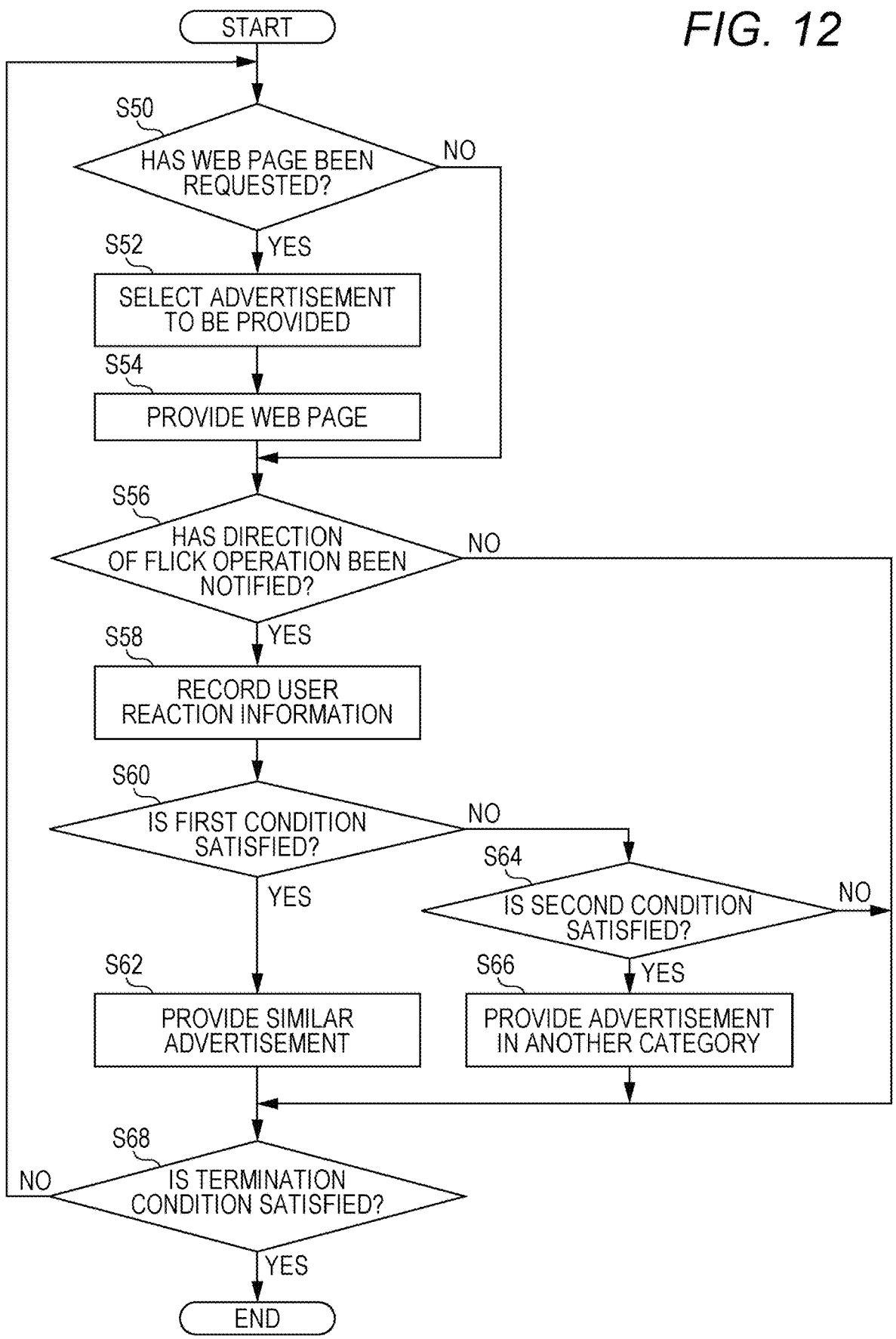
FIG. 12 is a flowchart illustrating an operation of the server.

FIG. 12 is a flowchart illustrating an operation of the server 14. When the request reception unit 66 receives the main content provision request (YES in S50), the advertisement determination unit 68 selects the advertisement to be added to the main content according to the requested main content (S52). The content providing unit 70 transmits the web page data including both the requested main content and the advertisement selected by the advertisement determination unit 68 to the requester user terminal 12 (S54). When the main content provision request has not been received (NO in S50), S52 and S54 are skipped.

When the operation information acquisition unit 72 receives information indicating the direction of the swipe operation to the advertisement image from the user terminal 12 (YES in S56), the reaction recording unit 74 identifies the reaction of the user to the advertisement according to the reaction definition information predetermined by the advertiser of the advertisement. Then, the reaction recording unit 74 stores the user reaction information to the advertisement to the reaction holding unit 64 (S58). In a case where the direction of the swipe operation to the advertisement image is the advertisement switch direction that satisfies a first condition, specifically, in a case where the direction corresponding to "want to see another advertisement" (YES in S60), the advertisement determination unit 68 newly selects another advertisement (for example, an advertisement having similar content) belonging to the same category as the advertisement selected in S52. The content providing unit 70 provides the newly selected advertisement to the user terminal 12 (S62).

In a case where the direction of the swipe operation to the advertisement image does not satisfy the first condition and is the advertisement switch direction that satisfies a second condition, specifically, in a case where the direction corresponding to "not interested in this advertisement" (NO in S60 and YES in S64), the advertisement determination unit 68 newly selects another advertisement (for example, an advertisement illustrating a totally different product or service) in a different category from the advertisement selected in S52. The content providing unit 70 provides the newly selected advertisement to the user terminal 12 (S66). In a case where the direction of the swipe operation to the advertisement image does not satisfy the second condition (NO in S64), S66 is skipped.

When the information indicating the direction of the swipe operation to the advertisement image is not received from the user terminal 12 (NO in S56), S58 to S66 are skipped. When the predetermined termination condition is satisfied (YES in S68), the flow in FIG. 12 is terminated. When the termination condition is not satisfied (NO in S68), the processing returns to S50, that is, returns to a state waiting for a request from the user terminal 12. This termination condition is satisfied when, for example, a server process is stopped in the server 14.

The server 14 of the embodiment can accumulate the reactions (feedbacks and impressions, and the like) of the user to the advertisement image according to the direction of the swipe operation of the user to the advertisement image. Also, not only negative evaluations (for example, "obstacle" and "inappropriate content") for the advertisement image but also various evaluations including a positive evaluation (for example, "want to see another advertisement" and "to check later") can be accumulated. As a result, the content provider can accumulate useful information for the advertiser and can appropriately provide the accumulated information to the advertiser.

Further, the server 14 can take various actions according to the reactions of the user, and can provide, for example, another advertisement different from the previous advertisement to the user. As a result, it is possible to provide advertisements that users are likely to be interested in can be provided and the number of selections (number of page views) of the advertisement on web page can be increased.

The present invention has been described on the basis of the embodiment. The embodiment is exemplarily described, and it should be understood by those skilled in the art that various modifications can be made in combinations of the constituent elements and processing processes, and such modifications are also included in the scope of the present invention.

A first modification will be described. In the above-described embodiment, the processing such as the detection of the swipe operation to the advertisement image, the notification of the direction of the swipe operation, and the update of the advertisement image (here referred to as "user-side processing") is implemented to the web page program (for example, the Javascript code) to be provided by the server 14 to the user terminal 12, whereby the web browser 44 of the user terminal 12 is caused to execute the user-side processing. As a modification, a content provider may provide a native application (called "content browsing application") implementing the user-side processing, and the content browsing application may be installed in the user terminal 12.

The user may activate the content browsing application on the user terminal 12 and request the content provider to provide the main content. In this case, both the main content and the advertisement are simultaneously displayed on the screen of the content browsing application, and the user inputs the swipe operation to the advertisement image on the screen. Note that the content browsing application may be provided as an add-on program of the web browser 44 of the user terminal 12, and the web browser 44 may be caused to execute the user-side processing by the add-on program being installed to the user terminal 12.

Further, as another mode, the user-side processing may be implemented in an advertisement program (for example, a combination of an advertisement image and a Javascript code) provided by the advertiser. A URL of and advertisement program provided by the advertiser may be set to the web page program of the main content provided by the content provider. In this case, the user terminal 12 acquires the advertisement program from the advertiser side when displaying the web page program acquired from the content provider. As a result, similarly to the embodiment, both the main content and the advertisement are displayed on the browser screen 80 of the user terminal 12, and the web browser 44 of the user terminal 12 can be caused to execute the user-side processing.

A second modification will be described. Although not mentioned in the above embodiment, the swipe operation in the predetermined direction to the advertisement image may be defined as meaning that the advertisement image should be permanently non-displayed on the user terminal 12. For example, in a case where the swipe operation in the predetermined direction is notified from the user terminal 12, the server 14 records, in a nonvolatile storage area, setting of not providing the advertisement to the user, and may suppress provision of the advertisement image in a case of receiving a provision request of the main content from the user. In other words, the setting may be switched to provide only the requested main content. Note that the non-display of the advertisement image may be a pay service and charging processing may be executed for the user who inputs the swipe operation in the predetermined direction.

Further, the server 14 may guide the user terminal 12 to a download site of an application that controls the advertisement image to be non-displayed (redirect or the like) in a case where the swipe operation in the predetermined direction is notified from the user terminal 12. This application may be, for example, a paid web browser 44 add-on program in which processing of controlling the web browser 44 not to acquire the advertisement data at the time of acquiring the main content (acquire only the main content) or cause the acquired advertisement to be non-displayed is implemented.

A third modification will be described. Although not mentioned in the above embodiment, the server 14 may have a function to feed back the user reaction information to each advertisement accumulated in the reaction holding unit 64 to the advertisement provision to the user. For example, the server 14 may further include a reaction information providing unit that periodically transmits the user reaction information to each advertisement accumulated in the reaction holding unit 64 to a device of the advertiser of the each advertisement. As a result, various feedbacks and impressions of the user to the advertisement can be provided to the advertiser, and improvement of content of the advertisement and determination of the type of the main content that the advertisement should be added to can be supported.

Further, the server 14 may further include a rule change unit that automatically changes the advertisement additional rule on the basis of the user reaction information. For example, in a case where a ratio occupied by the reaction type "obstacle" to the user reaction information specified by the combination of the main content 82 and the advertisement A84 is a predetermined value or more, which is large, the rule change unit may change the advertisement additional rule to associate main content other than the main content 82 with the advertisement A84. In other words, the advertisement additional rule may be changed to add the advertisement A84 to main content other than the main content 82 and present the main content with the advertisement A84 to the user.

A fourth modification will be described. The operation notification unit 40 of the user terminal 12 may transmit a character string associated with the direction of the swipe operation detected by the operation detection unit 38 to the server 14. For example, the operation notification unit 40 of the user terminal 12 may convert the direction of the swipe operation detected by the operation detection unit 38 into a reaction type on the basis of the reaction definition information provided from the server 14, and transmit the user operation information including the reaction type in place of the direction of the swipe operation to the server 14. In this case, the reaction recording unit 74 of the server 14 may store the user operation information provided from the user terminal 12 as it is as the user reaction information to the reaction holding unit 64. Note that, in the above embodiment, the correspondence holding unit 62 provided in the server 14 may be provided in the user terminal 12 in the present modification. The operation notification unit 40 of the user terminal 12 may convert the direction of the swipe operation detected by the operation detection unit 38 into a reaction type by reference to the local correspondence holding unit 62 and transmit a character string indicating the reaction type to the server 14.

A fifth modification will be described. In the case where the swipe operation in the advertisement storage direction is input to the advertisement image, the advertisement storage unit 42 of the above embodiment stores the advertisement data to the advertisement holding unit 30 of the user terminal 12. As a modification, the advertisement storage unit 42 may record the advertisement data to which the swipe operation in the advertisement storage direction has been input to the server 14. Specifically, the advertisement storage unit 42 may store information associating the ID of the user terminal 12 (or an ID of the user of the user terminal 12) with the advertisement ID to a predetermined storage area of the server 14 (for example, a storage area corresponding to the advertisement holding unit 30). That is, as a modification, the advertisement stored by the user may be stored in the storage unit 52 of the server 14 (a user stored advertisement holding unit that is an area holding the advertisement stored by the user separately from the advertisement holding unit 58), instead of being stored in the advertisement holding unit 30 of the user terminal 12. In this case, the advertisement holding unit 30 of the user terminal 12 becomes unnecessary.

When the link 86 is tapped, the user terminal 12 may request the server 14 to provide the web page of the stored advertisement list screen. The server 14 may detect one or more advertisement IDs stored in association with the user of the user terminal 12 in a predetermined storage area, and transmit a web page including one or more advertisement data identified with the advertisement IDs to the user terminal 12 as the web page of the stored advertisement list screen.

A sixth modification will be described. In the above embodiment, the user terminal 12 includes the user attribute holding unit 28. However, as a modification, the server 14 may have the user attribute holding unit 28 in place of the user terminal 12. For example, the user may register attribute information that may be disclosed to an administrator of the server 14 or the advertiser, of the attribute information of the user, to the server 14 in advance, and the server 14 may store the user attribute information in association with identification information of the user or the user terminal 12. An authentication unit (not illustrated) of the server 14 may specify the identification information of the user or the user terminal 12 as an access source by user authentication or terminal authentication. When receiving the user operation information (not including the user attribute information) from the user terminal 12, the reaction recording unit 74 of the server 14 may acquire the user attribute information associated with the identification information of the user or the user terminal 12 from the user attribute holding unit 28 and record user reaction information similar to the embodiment.

A seventh modification will be described. In the above embodiment, the technology for feeding back the reaction of the user to the advertisement in a case of displaying the main content and the advertisement at the same time has been exemplarily described. The technology of the embodiment is effective for efficiently collecting reactions of the user to additional content that is not limited to an advertisement (for example, content not directly requested by the user) in a case of presenting the additional content to the user in addition to the main content requested by the user.

It should be understood by those skilled in the art that the functions to be fulfilled by the constituent elements described in the claims are realized by individual constituent elements or by cooperation of the constituent elements described in the embodiment and modifications.

The present invention can be applied to an information processing apparatus or a server.

What is claimed is:

1. An information processing apparatus connected via a network to a server, comprising:
a touch panel; and
at least one processor configured to
issue a request to the server to provide first content,
acquire both the first content and second content different from the first content, from the server in response to the request;
display, on the touch panel, both first and second images of the first content and the second content, respectively,
detect a touch operation by a user to the second image of the second content displayed on the touch panel,
send user operation information and user attribute information, including at least one of sex and age of the user, to the server when the touch operation is detected, the user operation information identifying the second content, and the user attribute information defining characteristics of the user, the server storing data identifying the second content in response to the touch operation being detected,
acquire third content different from the second content from the server when the touch operation is detected,
display, on the touch panel, a third image of the third content in place of the second image of the second content, and
display the second content, in response to input of an instruction to display the second content, based on the data stored when the touch operation was detected.

2. The information processing apparatus according to claim 1, wherein the at least one processor is further configured to notify the server of information regarding a direction of the touch operation.

3. The information processing apparatus according to claim 2, wherein the server stores a plurality of types of reactions of the user to the second content in association with a plurality of directions of the touch operation, and
wherein the at least one processor is further configured to notify the server of the information regarding the direction of the touch operation to record a type of reaction by the user to the second content to the server.

4. The information processing apparatus according to claim 2, wherein the server stores a plurality of types of reactions of the user to the second content in association with a plurality of directions of the touch operation, and
wherein the at least one processor is further configured to notify the server of a character string associated with the direction of the touch operation to record, at the server, a type of reaction by the user to the second content.

5. The information processing apparatus according to claim 1,
further comprising computer storage, and
wherein the at least one processor is further configured to acquire the third content when a direction of the touch operation is a predetermined direction,
terminate the display of the second image of the second content when the touch operation by the user to the second image of the second content is detected,
store the second content in the computer storage when the direction of the touch operation is different from the predetermined direction, and
display, when a predetermined operation is input, the second image of the second content stored in the computer storage, unaccompanied by the first image of the first content.

6. The information processing apparatus according to claim 1, wherein the characteristics of the user define physical characteristics of the user.

7. The information processing apparatus according to claim 1, wherein the user attribute information includes a resident area of the user.

8. A server connected to a client device via a network, comprising:
at least one processor configured to:
provide, in response to a request for first content from the client device, both the first content and second content different from the first content to the client device to display, on a touch panel of the client device, both first and second images of the first content and the second content, respectively, acquire, from the client device, information regarding a touch operation by a user to the second image of the second content displayed on the touch panel, store data identifying the second content when the touch operation is detected, receive, from the client device, user operation information and user attribute information, including at least one of sex and age of the user, when the touch operation is detected, the user operation information identifying the second content, and the user attribute information defining characteristics of the user, provide, when the touch operation is detected, third content different from the second content, to the client device to display a third image of the third content in place of the second image of the second content on the client device, and provide the second content in response to an instruction from the client device to display the second content based on the data stored when the touch operation was detected.

9. The server according to claim 8, further comprising computer storage configured to record any of a plurality of types of reactions of the user to the second content according to the information regarding the touch operation.

10. The server according to claim 9, wherein the second content includes an advertisement, wherein the computer storage is further configured to hold data regarding correspondence between a plurality of directions of the touch operation and the plurality of the types of the reactions by the user to a plurality of advertisements available to be supplied as the second content, the advertisements specified in advance by a plurality of advertisers, and record, in response to information regarding a direction of the touch operation by the user to the second image of the second content, a type of reaction of the user to the second content according to the data regarding the correspondence specified in advance by an advertiser supplying the second content.

* * * * *